E. F. COOK.
SETTLING AND SEPTIC TANK.
APPLICATION FILED MAR. 21, 1922.

1,422,674.

Patented July 11, 1922.

Inventor
Edward F. Cook

By
Attorney

UNITED STATES PATENT OFFICE.

EDWARD F. COOK, OF FREEPORT, NEW YORK.

SETTLING AND SEPTIC TANK.

1,422,674.  Specification of Letters Patent.  Patented July 11, 1922.

Application filed March 21, 1922. Serial No. 545,412.

*To all whom it may concern:*

Be it known that I, EDWARD F. COOK, a citizen of the United States, residing at Freeport, in the county of Nassau, State of New York, have invented certain new and useful Improvements in Settling and Septic Tanks; and I do hereby declare the following to be a full, clear, and exact description of the invention, such as will enable others skilled in the art to which it appertains to make and use the same.

This invention relates to new and useful improvements in tanks and particularly to tanks adapted for sewage purification and disposal.

One object of the invention is to provide a tank of this character by means of which the solids of the sewage will be thoroughly broken up for destruction by bacteria.

Another object is to provide a septic tank of this character which is formed in sections thus permitting replacing of broken or leaking parts.

Another object is to provide a device of this character wherein the solids are initially broken immediately upon entrance into the tank.

Other objects and advantages will be apparent from the following description when taken in connection with the accompanying drawings.

Figure 1:
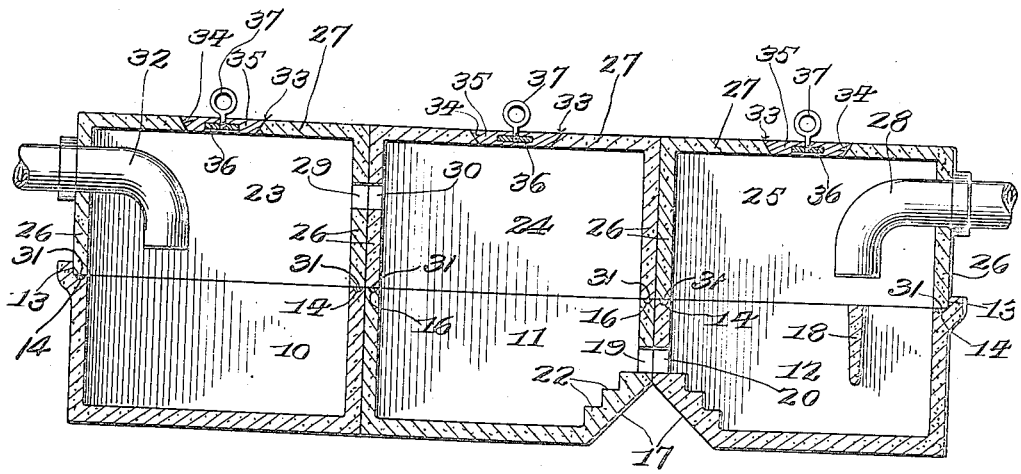
Figure 1 is a vertical longitudinal central sectional view of a settling and septic tank made in accordance with the invention.
Figure 2:
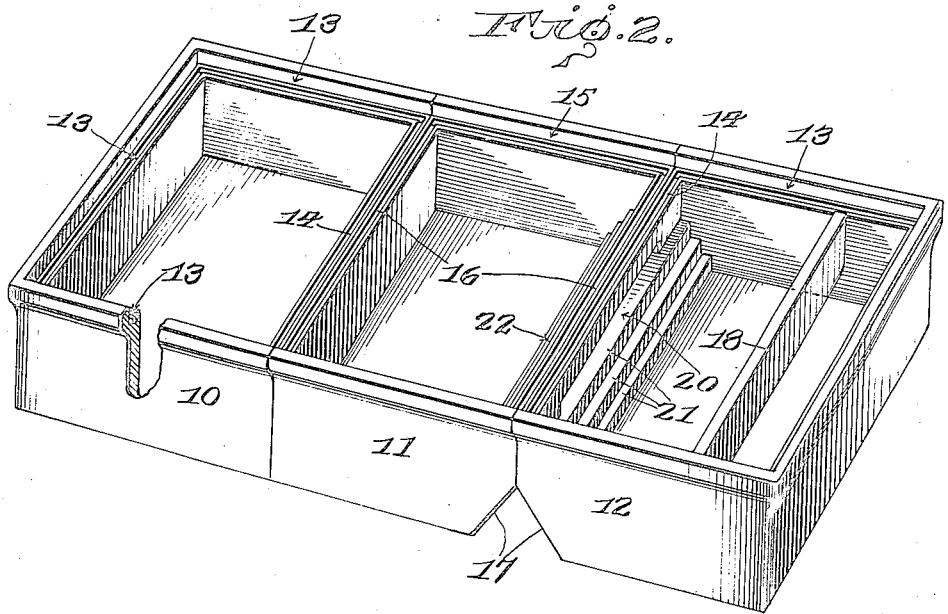
Figure 2 is a perspective view of the lower portion of the device, partly broken away.

Referring particularly to the accompanying drawing, 10, 11, and 12, represent the lower tanks of the device, the former and latter having their two end walls and the outer wall formed with rabbets 13, in their upper edges, while the remaining wall has a longitudinal groove 14 in its upper edge. The intermediate tank 11 has its end walls rabbeted, as at 15, to line up with the rabbets of the end walls of the tanks 10 and 12, while the longer side walls have longitudinal grooves 16 in their upper edges. The lower portions of the longer side walls of the intermediate section 11 are undercut, as at 17, for the purpose of economizing in material. It will be noted that the upper edges of the inner longer walls of the three tanks lie in the plane of the ledges of the rabbeted edges of the other walls. Extending transversely in the tank 12, with its upper edge face in the plane of the rabbets of the walls of the tanks, and with its lower edge spaced a suitable distance above the bottom of the tank, is a baffle wall 18. It will also be noted that the mutually adjacent longer walls of the tanks 10 and 11 abut, as do also the mutually adjacent longer walls of the tanks 11 and 12. In the mutually contacting walls of the tanks 11 and 12 there are formed the elongated longitudinally extending, and registering openings 19 and 20, respectively, through which the liquids and solids pass from the tank 12 to the tank 11, after passing beneath the baffle wall 18.

In the upper face of the inclined portion or undercut portion of the inner longer wall of the tank 12, there are formed the longitudinally extending series of steps 21, the same leading from the bottom of the tank to the level of the lower wall of the opening 19. Similarly formed on the corresponding portion of the adjacent longer wall of the tank 11 are the series of stems 22, the same beginning at the bottom of the tank and terminating at the lower wall of the opening 20.

Disposed on the tanks 10, 11, and 12, respectively, are the inverted box-like covers 23, 24, and 25, each of which has three surrounding walls 26, and the top wall 27. Leading through the outer side wall of the cover 25 is an inwardly and downwardly curved pipe 28, which is properly connected to the closet and waste of an adjacent dwelling, not shown, and through which the sewage is discharged into the tank 12. This pipe 28 is so disposed, with relation to the baffle wall 18, that it discharges its matter directly against the upper edge thereof, so that the solids of the sewage will be initially broken, before falling to the bottom of the tank. A portion of the liquids and solids thus pass over the wall 18, while the remainder passes beneath said wall, and rises at the other side of the wall.

In the mutually contacting longer walls of the covers 23 and 24 there are formed the longitudinally extending and registering openings 29 and 30. The lower edge faces of the contacting walls of the covers 23 and 24, and 24 and 25, are formed with longitudinal beads 31 which seat in the grooves 14 and 16, suitable sealing cement being placed in said grooves, and in the rabbets of the remaining walls, to effect a water-tight joint all around the points of contact between the covers and the tanks.

On the outer longer wall of the cover 23 there is secured a discharge pipe 32 which conducts the liquids to the surrounding soil, or to a sewer, not shown.

In the upper wall of each of the covers 23, 24, and 25, there is formed an access opening 33, the surrounding walls of which beveled, at 34, to receive thereon the beveled edge of the removable man-hole cover 35. Through each of these holes a man is to enter the tanks for the purpose of applying the proper sealing cement to the joints between the tanks and their respective covers.

The tanks, as well as the covers, are formed from cast metal, or may be formed from molded cement composition, and embedded in each of the covers, at suitable points, as the internally threaded plates 36, for the reception of the threaded stems of the handle members 37, said handles serving as a means for lifting the covers into place, and for removing the same when the tanks are to be cleaned.

The purpose of the steps 21 and 22 is to break the solids as they pass upwardly, through the openings 19 and 20, and then downwardly into the tank 11. Thus the solids can be more readily attacked by the bacteria. From the tank 11, the sewage rises and passes into the tank 10, through the openings 29 and 30, into the discharge pipe 32, and thence into the surrounding soil, or to a sewer pipe.

There is thus provided a device whereby the solids may be properly and effectively broken up, and after having mixed, to a large extent, with the liquids, pass out to the soil.

In each cover there is embedded nuts similar to the nuts 36, for the reception of handle members similar to the handle members 37, which are removed after the devices have been lowered into place.

What is claimed is:

1. A septic tank for sewage comprising a plurality of tanks, a cover for each tank, communication between two adjacent tanks, communication between two other adjacent tanks, through the covers thereof, a baffle in one of the tanks for receiving sewage thereagainst and for breakage thereof, a rising series of solids breaking means leading to the first communication, a descending series of solids breaking means leading from the first communication, means for conveying liquids from the device, and means for leading sewage to the device and discharging same against the said baffle.

2. A settling and septic tank comprising a series of smaller tanks, two adjacent tanks being provided with communication adjacent their lower portions while the other two adjacent tanks have communication adjacent their upper portion, a longitudinal series of steps rising from the bottom of the tank at one end of the series to the communication thereof, a longitudinal series of steps leading from said communication to the bottom of the next adjacent tank, and a baffle wall extending longitudinally in the said end tank with its upper edge in the plane of the upper edge of the tank and its lower edge spaced from the bottom of the tank, and an inverted box-like cover for each of the smaller tanks.

In testimony whereof I affix my signature in the presence of two witnesses.

EDWARD F. COOK.

Witnesses:
E. W. HOTCHKISS,
JOHN E. OTIS, Jr.